3,297,645
POLYMERIZATION OF TRIOXANE

Donald B. Miller, Ponca City, Okla., assignor to Continental Oil Company, Ponca City, Okla., a corporation of Delaware
No Drawing. Filed Oct. 21, 1963, Ser. No. 317,768
12 Claims. (Cl. 260—67)

The present invention is concerned with an improved method for the polymerization of trioxane.

Trioxane can be polymerized to a high molecular weight polyoxymethylene by means of certain metal fluorides. It was found that not all metal fluorides will function as catalysts. For example, it was found that ferric fluoride and lead fluoride are inoperative for this purpose and that ammonium fluoride is also not workable. The use of metal fluorides as catalysts is usually objectionable, because they are difficult to separate from the polyoxymethylene product. There is need for a catalyst which will be useful for the polymerization of trioxane and can be readily separated from the final product.

An object of this invention is to provide a novel method for the polymerization of trioxane to polyoxymethylene products.

Another object of this invention is to provide a novel method for the production of polyoxymethylene of high crystallinity.

Still another object is to provide a novel method of preparing copolymers of trioxane.

Other objects and advantages will become apparent from the following description and explanation thereof.

In accordance with the present invention, trioxane alone or with another comonomer such as a cyclic ether containing an ethyleneoxy group can be polymerized to produce solid polymers by means of silicon tetrafluoride.

The polymerization of trioxane can be effected in the presence of silicon tetrafluoride with the trioxane as either a solid, liquid or a gas or vapor. Since the silicon tetrafluoride is weakly acidic, there is less tendency for the polymeric product to be damaged by the catalyst than with previously used catalysts; consequently, wide variations in the temperature of polymerization can be employed. The silicon tetrafluoride is normally a gaseous material, which means that it can be easily separated from the polymeric material at the conclusion of the reaction. It is also a mild catalyst and therefore in use it lends itself to better control as to the rate of polymerization of the trioxane. In many polymerization processes, catalyst residue is a problem, but this is not the case in the process of the present invention.

The trioxane may be dissolved or suspended in an inert liquid or solvent and the silicon tetrafluoride combined therewith for a period of time suitable for the desired polymerization to occur. The inert liquid or solvent for this purpose may be an aromatic hydrocarbon such as benzene or toluene, an alicyclic hydrocarbon such as cyclohexane, methylcycloehxane and cyclopentane, a paraffin hydrocarbon such as hexane, heptane, a chlorinated hydrocarbon such as hexylchloride, chlorobenzene or any other suitable inert hydrocarbon, halogenated hydrocarbon, or other inert liquid, e.g., ethers. The trioxane may also be used as a vapor or as a solid material either as such or suspended in an inert liquid medium.

In one method which may be employed, the trioxane is first melted by warming to a suitable temperature, combined with the catalsyt, following which the temperature is reduced to solidify the trioxane. The polymerization is then effected at a suitable temperature to maintain the trioxane in the solid state until the reaction is completed.

The trioxane may be polymerized by itself or copolymerized with a cyclic ether, such as, for example, ethylene oxide, 1,3-dioxolane, 1,4-dioxane, trimethylene oxide, tetramethylene oxide, pentamethylene oxide, 1,2-propylene oxide, 1,2-butylene oxide, etc. The cyclic ether has at least two adjacent carbon atoms and is employed in an amount to provide about 5:1 to 10,000:1 of oxymethylene to oxyethylene groups in the polymer.

The polymerization of trioxane may be effected at a temperature of about $-15°$ C. to $+115°$ C. For vapor phase polymerization, the trioxane vapor is introduced into a reaction zone whose walls are maintained preferably at about $-15°$ C. to $50°$ C., more usually about $15°$ C. to $30°$ C. In liquid phase polymerization, the temperature of polymerization may preferably be about $65°$ C. to $115°$ C., more usually about $70°$ C. to $90°$ C. In solid phase polymerization, the solid trioxane as such or suspended in an inert liquid medium, is maintained at a temperature preferably below about $65°$ C., and usually about $25°$ C. to $60°$ C. The copolymerization of trioxane with cyclic ethers may also be effected under a similar range of temperature, that is, about $-15°$ C. to $115°$ C. Thus, in the vapor phase, the polymerization may be carried out at temperatures ranging from $-15°$ C. to $115°$ C. On the other hand, in liquid copolymerization, the temperature may range from $65°$ C. to $115°$ C. It is also possible to carry out polymerization or copolymerization in solution, in which case, by appropriate selection of a solvent the polymerization may be carried out in a range of temperature ranging from about $-15°$ C. to $115°$ C.

The polymerization of trioxane alone or with a cyclic ether may be carried out under varying pressure conditions, namely subatmospheric, atmospheric and superatmospheric pressure. More usually, the pressure of polymerization is about 0 to 50 p.s.i.g. The time of reaction may also vary considerably, depending upon how much polymerization is desired. Generally, the period of polymerization may be from about 1 to 75 hours, more usually about 1 to 30 hours.

The amount of silicon tetrafluoride employed in the polymerization reaction may vary widely, for example, about 0.001 to 10.0 percent by weight of catalyst, more usually, about 0.01 to 5.0 percent by weight of catalyst based on the trioxane is employed.

The same range of catalyst concentration may be used for copolymerization as given for polymerization.

The conditions of polymerization are preferably anhydrous, although ordinary commercial trioxane, which usually contains some water, may be used under certain conditions.

The products obtained from the polymerization of trioxane have an X-ray crystallinity as high as 94 to 97 percent. The polymers also have inherent viscosities of about 0.5 to 5.0.

To provide a better understanding of the present invention, reference will be had to specific examples of the same.

Example 1

30 ml. of liquid trioxane which has been previously dried over calcium hydride was charged to a polymerization bottle. The bottle was flushed with silicon tetrafluoride and left overnight (a period of about 16 hours) on a steam bath. A solid block of polymer was thus produced, which was broken up and slurried in ammoniacal isopropanol. The polymer was stabilized with diphenylamine. On pressing the polymer, tough translucent films were obtained. The inherent viscosity of the polymer (0.5 g./dl.) in p-chlorophenol at $60°$ C. was 5.7. The polymer had an X-ray crystallinity of about 94 percent.

Examples 2–6

A series of runs were made in which the amount of moisture and catalyst were varied. In each run, 20 grams of trioxane were charged into a polymeriztion bottle, the bottle was evacuated and then a measured quantity of silicon tetrafluoride was added thereto. The polymerization took place for 18 hours in a water bath maintained at a temperature of about 65° C. to 75° C. The resultant polymers were stabilized with diphenylamine and pressed into films. The results are reported below.

| Ex. No. | Trioxane | SiF₄ Ml. | Polymer Inher. Visc. | Film |
|---|---|---|---|---|
| 2 | Dry* | 200 | 0.51 | Somewhat brittle. |
| 3 | Dry* | 20 | 2.5 | Tough. |
| 4 | 1 ml. H₂O | 200 | 0.47 | Somewhat brittle. |
| 5 | Comml | 50 | .72 | Poor. |
| 6 | Comml | 5 | 1.42 | Do. |

*Dried over calcium hydride.

The polymer of Example 3 had an X-ray crystallinity of 95 percent and a melting point of 186° C. to 190° C.

*Examples 7–10*

Commercial solid, granular trioxane in an amount of 20 grams was charged to each of several polymerization bottles, the bottles evacuated and then SiF₄ in the amounts shown below was added. The bottles were placed in an oven held at 55° C. to 58° C. for about 18 hours. The crude polymer was slurried once in water and again in methanol in a blender, and then filtered and dried in a vacuum oven at 50° C. to 60° C. The polymers were then stabilized with diphenylamine and pressed into tough flexible films. The polymer from Example 9 decomposed at the rate of 1.4 percent minute at 222° C. and had a crystalline melting point of 189.5° C. to 193° C., and an X-ray crystallinity of 96 percent.

| Example No. | SiF₄ ml. | Percent Yield Polymer | Polymer Inherent Viscosity |
|---|---|---|---|
| 7 | 200 | 88 | 2.05 |
| 8 | 100 | 85 | 2.26 |
| 9 | 50 | 68 | 3.51 |
| 10 | 20 | 59 | 3.49 |
| Control | 0 | 0.5 | |

*Examples 11–14*

20 grams of commercial trioxane were charged to each of several polymerization bottles, and the bottles evacuated. After the trioxane was melted by warming to 65° C. to 70° C., silicon tetrafluoride in the amount shown in the table below was charged to each bottle, the contents of the bottles mixed and then the trioxane was solidified by cooling. The bottles were then kept at 55° C. to 58° C. for about 18 hours. The polymeric products were separated as described in connection with Examples 7–10. The polymer from Example 13 below was found to be 97 percent crystalline, had a decomposition rate of 1.4 percent per minute at 222° C. and a crystalline melting range of 190° C. to 194° C.

| Example No. | SiF₄ ml. | Polymer Yield Per Cent | Inherent Viscosity | Film |
|---|---|---|---|---|
| 11 | 200 | 87 | 1.32 | Partly brittle. |
| 12 | 100 | 81 | 1.91 | Do. |
| 13 | 50 | 62 | 3.14 | Tough. |
| 14 | 20 | 49 | 2.37 | Do. |

*Example 15*

31.7 grams of dry trioxane and 7.8 grams of dry 1,3-dioxolane were charged to a polymerization bottle and the bottle evacuated, 200 ml. of SiF₄ were charged to the bottle, and the mass reacted at 65° C. to 85° C. for 18 hours. A tough, horny solid block of polymer was formed. The films from this polymer were drawn into thin transparent sections before breaking. The crystalline melting point was 145° C. to 150° C. The inherent viscosity (0.5 g./dl.) in p-chlorophenol containing 2 percent alpha pinene was 1.6. On heating at 222° C., the copolymer lost about 5 percent of its weight in the first 10 minutes and thereafter showed no weight loss. The infrared spectrum of the film was different from the polyoxymethylene films of the previous examples.

*Example 16*

4.8 grams of ethylene oxide were added to 33.2 grams of dry trioxane in an evacuated polymerization bottle. The bottle was filled with SiF₄ until one atmosphere was reached in the bottle. The mass was maintained at 65° C. to 85° C. for 18 hours, and a solid block of polymer was formed. The inherent viscosity of the polymer (0.5 g./dl.) was 0.55 in p-chlorophenol containing 2 percent alpha pinene. Flexible films of the polymer were formed. The polymer had a crystalline melting point of 150° C. to 155° C.

Although this invention has been described with respect to particular embodiments thereof, it is not to be so limited, as changes and modifications may be made therein which are within the spirit and scope of the invention as defined by the appended claims.

What is claimed is:
1. A process which comprises polymerizing trioxane in the presence of silicon tetrafluoride to produce polyoxymethylene under substantially anhydrous conditions.
2. The process of claim 1 in which the trioxane is a solid.
3. The process of claim 1 in which the trioxane is a liquid.
4. The process of claim 1 in which the trioxane is a gas.
5. The process of claim 1 wherein the trioxane is dissolved in an inert liquid medium and polymerized at a temperature of about −15° C. to 115° C.
6. A process which comprises copolymerizing trioxane and a cyclic ether having two adjacent carbon atoms in the presence of silicon tetrafluoride.
7. A process which comprises polymerizing solid trioxane in the presence of about 0.001 to 10 percent by weight silicon tetrafluoride and at a temperature of about 25° C. to 60° C.
8. A process which comprises polymerizing liquid trioxane in the presence of about 0.001 to 10 percent by weight silicon tetrafluoride, at a temperature of about 65° C. to 115° C., and under anhydrous conditions.
9. A process of copolymerizing trioxane and a cyclic ether having two adjacent carbon atoms which comprises reacting the same at a temperature of about −15° C. to 115° C., and in the presence of silicon tetrafluoride.
10. The process of claim 9 wherein the cyclic ether is 1,3-dioxolane.
11. The process of claim 9 wherein the cyclic ether is ethylene oxide.
12. A process which comprises contacting liquid trioxane with silicon tetrafluoride, thereafter reducing the temperature of the reaction system sufficiently to solidify the trioxane and carrying out polymerization of trioxane in the solid state.

References Cited by the Examiner
UNITED STATES PATENTS

| 2,795,571 | 6/1957 | Schneider | 260—67 |
| 2,947,728 | 8/1960 | Bartz | 260—67 |
| 3,027,352 | 3/1962 | Walling et al. | 260—67 |
| 3,243,409 | 3/1966 | Kornicker et al. | 260—67 |

SAMUEL H. BLECH, *Primary Examiner.*

WILLIAM H. SHORT, *Examiner.*

L. M. MILLER, *Assistant Examiner.*